Jan. 14, 1936.  T. J. HEADLEE  2,027,976
PROCESS FOR TREATING MATERIALS ELECTROSTATICALLY
Filed March 17, 1933

THOMAS J. HEADLEE
INVENTOR
BY
ATTORNEY

Patented Jan. 14, 1936

2,027,976

UNITED STATES PATENT OFFICE 2,027,976

PROCESS FOR TREATING MATERIALS ELECTROSTATICALLY

Thomas J. Headlee, New Brunswick, N. J., assignor to Endowment Foundation, New Brunswick, N. J., a corporation of New Jersey Application March 17, 1933, Serial No. 661,294

8 Claims. (Cl. 175—311)

This invention relates to a special process for treating materials electrostatically, and more especially plants and plant products, which become infested with insects and/or closely related animal forms, without damaging the plants or the plant products.

I have found, after much study supplemented by a long series of tests and experiments, that insects or the like which infest plants and plant products may be destroyed by the development therein of lethal internal heat, without injury to the materials on or in which the said insects or the like exist.

From my investigations I have discovered that when these insects or pests are passed through or subjected to an electrostatic field of a certain character, they will be killed within a time dependent on the characteristics of the electrostatic field, and I have further found that a very safe differential can be established between the time required for killing the insects or pests and the time at which the viability of the plant product would be affected or the plant or other material injured.

In my investigations I have subjected certain insects and plant products and other materials to an electrostatic field having a voltage gradient ranging from 500 to 6,000 volts per linear inch between the electrodes, the energy supply having a frequency from 500,000 to 20,000,000 cycles per second, and from the tests and observations made, I have determined what comprises a safe differential between the character of the field required to kill the insects within a very short time, and the viability point of the plant products, or the time when the plant will be injured if subjected to this same field. For example, honey bees, when exposed to a frequency of 2,000,000 cycles and a voltage gradient of 4,000 volts per linear inch, are killed in less than a minute, whereas wheat seed may be exposed to the same frequency and the same field potential for a period of eighty minutes without any injury whatever to its viability.

I have furthermore determined that for general purposes there is nothing to be gained by running the frequency above 3,000,000 cycles per second; in fact, a frequency of 1,000,000 gives very satisfactory results with a field strength of approximately 4,000 volts per linear inch. Therefore, it can be stated as a general proposition that excellent results may be obtained by my process by using a voltage of 4,000 per linear inch with a frequency of 1,000,000 to 3,000,000. At these frequencies and field strength, the insects are killed within a very few minutes—in some cases one minute or less—while the plant products are unhurt for 40 to 80 minutes more or less, thus establishing a very safe differential as has been referred to.

My process is not to be confused with other processes for destroying insects or the like by disruptive conduction methods, such as exemplified in Smith Patents 1,016,449, issued February 6, 1912; 1,352,699, issued September 14, 1920; 1,399,162, issued December 6, 1921, and others, wherein "disruptive" discharges take place across the electrodes. In my system, the frequency of the energy is entirely different and of a much higher order, and is a very important factor in producing the lethal heating effects previously referred to.

To merely diagrammatically illustrate how my process may be applied in practice, reference is made to the attached drawing, in which.

Figure 1:
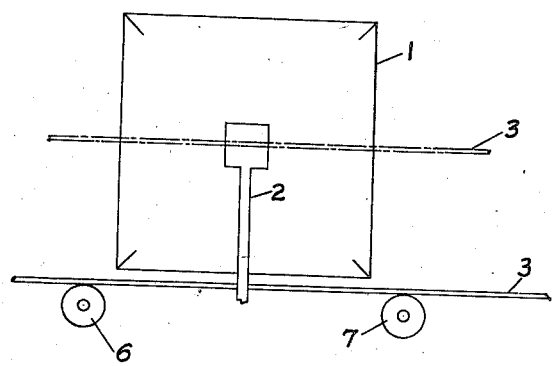
Figure 1 is a side elevation showing field electrodes and a conveyor for carrying the materials through the electrostatic field.
Figure 2:
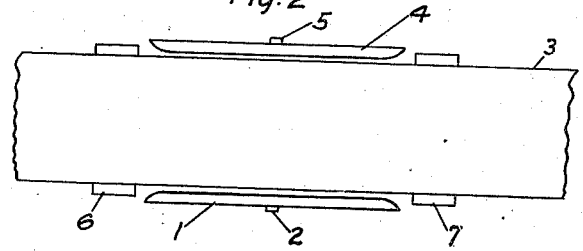
Figure 2 is a plan view of Figure 1.

In the two figures of the drawing, 1 and 4 are plate electrodes which may be mounted in any satisfactory manner, preferably so that they can be raised and lowered with respect to a conveyor belt 3 supported on rollers 6 and 7. The belt may be driven by any satisfactory source of power. The source of electrical energy is connected to the plates 1 and 4 in any satisfactory manner as by electrode terminals 2 and 5. Preferably the source of energy is one that can be adjusted with respect to voltage and frequency, but since the source of energy forms no part of my invention, it is not necessary to be further described herein.

When the conveyor 3, which may be in the form of a belt, is desired to carry plants through the electrostatic field between the plate electrodes 1 and 4, either the conveyor 3 is dropped or the electrodes raised to the position indicated in full lines in Figure 1, so that the plant roots, if potted plants are being treated, shall not come within the direct influence of the electrostatic field. On the other hand, if balled earth plants are to be treated, the conveyor 3 should have a relative position with respect to the electrodes as indicated in dotted line in Figure 1, so that the plant roots are within the electrostatic field and the aerial portions outside the field. If grain in bulk is to be treated, the conveyor should be in the same position as for the balled earth plants, and preferably the sides of the conveyor would have edges to prevent the grain from falling off.

To handle the various conditions, there should be a relative adjustment between the field electrodes and the conveyor, all of which relates to mechanical details which are not essential to an understanding of my process of treating materials for the purpose of killing insects or the like thereon or therein.

Having thus described my invention, what I claim is:

1. The process of treating plant-products which consists in passing said products along on a conveyor and at the same time subjecting the products to an electrostatic field established between suitable electrodes by a source of energy having a frequency preferably not less than 1,000,000 cycles, and a voltage preferably of the order of 4,000 volts per linear inch between said electrodes, the speed of movement through said field being such that the plant products being treated are not injured, while the insects or the like infesting said products are killed.

2. The process of treating plant-products which consists in passing said products along on a conveyor between at least one pair of plate electrodes, and at the same time applying to said electrodes a source of electrical energy having a frequency preferably not less than 1,000,000 cycles, and a voltage preferably of the order of 4,000 volts per linear inch between said electrodes, the speed of movement through said field being such that the plant products being treated are not injured, while the insects or the like infesting said products are killed.

3. The process of treating materials which may be infested with insects and/or closely related animals which consists in passing the materials through an electrostatic field produced between electrodes by a source of electrical energy having a voltage of preferably not in excess of 6,000 per linear inch between electrodes, and a frequency preferably not in excess of 3,000,000 cycles, the speed of movement through said field being such that the treated materials are not injured, while the insects or the like infesting said materials are killed.

4. The process of treating plant products which may be infested with insects or the like, which consists in passing said products, at such a speed, through an electrostatic field produced by a source of energy having a high frequency and voltage gradient, that insects or the like are killed in a relatively short time, the speed of movement being such with relation to the field that a safe differential is established between the time required to kill the insects or the like, and the time when the viability of the plant product will be effected.

5. The process of treating materials which may be infested with insects and/or closely related animals which consists in passing the materials at such a speed through an electrostatic field produced between electrodes by a source of electrical energy having a voltage which will not produce disruptive discharges between said electrodes, and a high frequency which, acting with the field strength, will develop lethal heating effects within the insects or the like long before any injury is done to the materials.

6. The method of treating insect-infested material in bulk for the destruction of insect life in all forms therein, which consists in subjecting the host material to the action of high-frequency electrical oscillations, the frequency and voltage being regulated with regard to the conductivity of the insect life and the host material to kill all forms of the insect life within a time period below that required to injuriously heat the host material.

7. The method of treating insect-infested material in bulk for the destruction of all forms of insect life therein, which consists in subjecting the material to the action of short waves from a suitable generator, the frequency and voltage being sufficient to overcome the impedance of the material and to produce lethal heat in all forms of insect life therein without injury to the material.

8. An apparatus for destroying insect life in all forms in infested materials comprising, electrodes forming an electrostatic field, means for passing a bulk charge of the infested material through said field and a short wave oscillation generator circuit including said electrodes and operatively adjustable to produce short waves of a frequency and voltage to rapidly penetrate the material and kill the insect life therein without injury to the material.

THOMAS J. HEADLEE.